United States Patent
Goeke et al.

(10) Patent No.: US 7,853,970 B2
(45) Date of Patent: Dec. 14, 2010

(54) METHOD FOR SELECTIVE DISPLAY OF TELEVISION PROGRAMMES

(75) Inventors: Maxime Goeke, Borex (CH); Patrick Bertholet, Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1310 days.

(21) Appl. No.: 10/240,040

(22) PCT Filed: Apr. 11, 2001

(86) PCT No.: PCT/IB01/00605
§ 371 (c)(1),
(2), (4) Date: Sep. 27, 2002

(87) PCT Pub. No.: WO01/80552
PCT Pub. Date: Oct. 25, 2001

(65) Prior Publication Data
US 2003/0101455 A1    May 29, 2003

(30) Foreign Application Priority Data
Apr. 14, 2000 (CH) ..................... 740/00

(51) Int. Cl.
*H04N 7/16* (2006.01)
(52) U.S. Cl. ............... 725/30; 725/25; 725/45; 725/46
(58) Field of Classification Search .......... 725/44, 725/46
See application file for complete search history.

(56) References Cited

U.S. PATENT DOCUMENTS

| | | | |
|---|---|---|---|
| 5,583,560 A * | 12/1996 | Florin et al. ............... 725/40 |
| 5,945,988 A * | 8/1999 | Williams et al. ............ 715/747 |
| 6,481,010 B2 * | 11/2002 | Nishikawa et al. ............ 725/44 |
| 6,922,843 B1 * | 7/2005 | Herrington et al. ............ 725/30 |
| 2001/0010095 A1 * | 7/2001 | Ellis et al. ..................... 725/44 |
| 2004/0128681 A1 * | 7/2004 | Hancock et al. ............... 725/30 |
| 2005/0198677 A1 * | 9/2005 | Lewis .......................... 725/87 |
| 2009/0019485 A1 * | 1/2009 | Ellis et al. ..................... 725/40 |

FOREIGN PATENT DOCUMENTS

| | | |
|---|---|---|
| DE | 4201031 | 7/1993 |
| EP | 0 889 647 A2 | 1/1999 |
| WO | 98/53609 | 11/1998 |
| WO | 99/34564 | 7/1999 |
| WO | 99/35846 | 7/1999 |

\* cited by examiner

*Primary Examiner*—Brian T Pendleton
*Assistant Examiner*—Nnenna N Ekpo
(74) *Attorney, Agent, or Firm*—Harness, Dickey & Pierce, P.L.C.

(57) ABSTRACT

As television programs increases, it becomes necessary to find means for rapidly accessing the users' preferred programs. Furthermore, television programs are addressed to different types of users such as children and adults. The proposed system processes a program grid comprising at a higher level the whole information on programs and at a lower level, information specific to a users group as well as parameters defining a user profile. The parameters are divided into several sets of parameters, each set corresponding to a filter layer allowing selecting a category or categories of required information. The first layer, defining a global restrictive filter, is defined by an administrator of the system and the following layers, defining a filter specific to a users group and containing filtering short commands, are defined by at least one member of the users group.

9 Claims, 1 Drawing Sheet

METHOD FOR SELECTIVE DISPLAY OF TELEVISION PROGRAMMES

The present invention concerns a method for the selective display of television programs, particularly the display of pay television programs.

BACKGROUND

In order to satisfy as large a public as possible the offer of pay television is characterized by an abundance of proposals.

When subscribing to a group of television channels the viewer is faced with an immense offer amongst which he/she has difficulty in making a choice efficiently.

The voluminous television programs have been replaced by a user-friendly display directly on the screen. These programs are known as EPG ("Electronic Program Guide").

They offer the advantage of not needing paper and they are always up to date.

The different emissions proposed comprise indications of categories in order to facilitate the viewer's choice. It is understood by "category" an indication such as "news", "sports", "fiction", etc.

Furthermore, a second category is added to the first to determine the age class of the proposed emissions.

The known EPG systems have a filter that allows to filter the programs that are displayed and thus are accessible to the viewer according to the indication of the age class. After an authorized user starts the system (for example, the parents), access to certain categories is subject to a password.

Although this structure offers a necessary parental control, it is not enough for a synthetic display of the television offer.

SUMMARY

The objective of the present invention is to propose a method for filtering the information that is most likely to interest the viewer who is using the system, at the same time allowing him/her to access other emissions in an easy way.

The objective of the invention is achieved by a processing system of the program grid comprising at least two filter layers, each filter allowing to select the categories of desired emissions, the first layer defining a global filter and the following layers defining an individual filter.

The main layer works as a community filter. All persons using the television system will see the offer filtered by this first filter. Access to the parameters of this layer is subject to a first password. To this is added an individual filter that each user can apply to the offer of emissions he/she wishes to view.

One of the particularities of the method according to the invention is the definition of the direct accesses, that is, the functions that can activate or disconnect a filter.

Let us take as an example the user that is interested mainly in sports emissions. In order to access quickly his/her favorite emissions amongst the abundance of offers of the group of televisions, this user will select his/her filter in order to view only the sports emissions. It is a bit reductive to see the user that is a sports fan not being interested at all in other emissions. This is why the direct access function allows, for example, to disconnect momentarily the single selection of sports emissions in order to display other categories, for example, news.

For this purpose, the direct access function can either:
 suppress or activate the user filter, allowing thus the viewing of all the emissions authorized by the community filter or inversely only viewing the emissions authorized by the filter.
 add or delete one or several categories, allowing thus either to view in a more extensive manner than before or on the contrary carrying out a zoom function, that is, by only one function, to select only one category, for example, the animal emissions.
 to define one or several categories of filter.

These direct access functions offer a great range of possibilities of use to find the preferred emissions in the vast offer of several television channels.

According to one embodiment, only the first identification of the user is subject to a password, the direct access operations are in themselves executed without a password.

Access to these functions can be obtained ideally by keys for this purpose on the remote control. According to a first embodiment, one single key commands the direct access function linked with one of the keys 0 to 9 to select the direct access function 1 to 10.

According to another embodiment, the remote control comprises several keys to this effect and only one click is enough to request the direct access function.

The invention will be better understood by means of the following detailed description which makes reference to the annexed drawings that are offered as a non-limiting example, in which:

DETAILED DESCRIPTION OF EXAMPLE EMBODIMENTS

Figure 1:
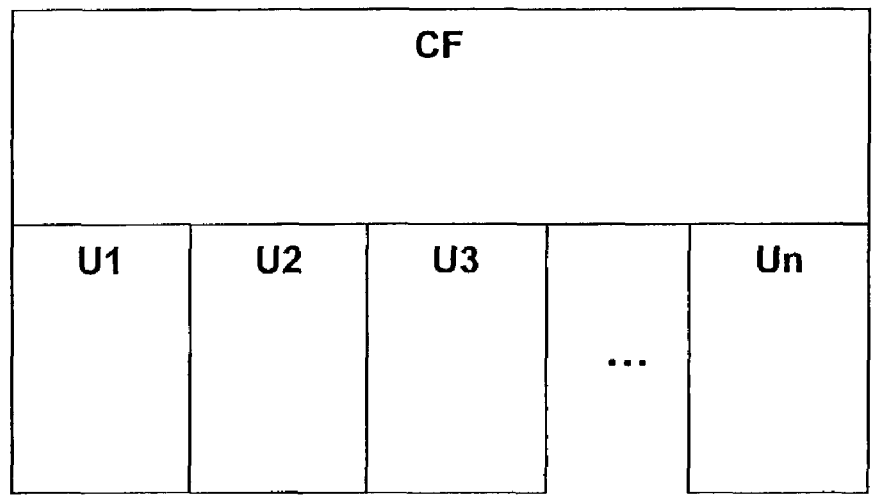
FIG. 1 represents the structure of the organization of the filters.

In FIG. 1 the community layer is named CF. This layer is accessible to the manager of the system by means of a specific password. In this layer it is possible to define the categories that intervene for all the users. The frame of each user is equally defined at this level, for example, to assign a credit for the purchase of emissions.

To this community layer CF is annexed a user layer Un, specific to each individual, even for a group such as children. In this layer a password is firstly defined that allows access to the edition of this layer and a password that may be different for using the functions of this layer.

In this way it will be possible to define the direct access functions that will be executed with a simple click on the adequate key.

Let us take for example user A, whose parameters are defined in block U1. This user has a first password when he/she starts the decoder that allows to identify him/her. At this moment, the system recognizes A and applies to him/her the parameters of layer U1. In this layer it is defined to view only cartoons. A will then be able to choose only amongst the television offer of cartoons.

In the parameters of layer U1 the direct access key has been defined as: add the category "animal documentaries".

In this way from the moment the user A sets off key R1 he/she can view cartoons and animal documentaries.

In this example, the direct access key R2 is defined to view only the sports category. For this reason the activation of the key R2 produces the cancellation of the previous viewing and that of the sports emissions.

It can be important to forbid the modification of the user layer to its user. For example, the community layer authorizes the "adult" category when the key U1 forbids it. If the user can of his/her own will modify the parameters of his/her layer, he/she will be able to regain access to the adult emissions as they are authorized by the community layer. This is why, according to a first embodiment, a specific password, different to that of recognition of the user, is necessary to modify the parameters of the user layer.

Figure 2:
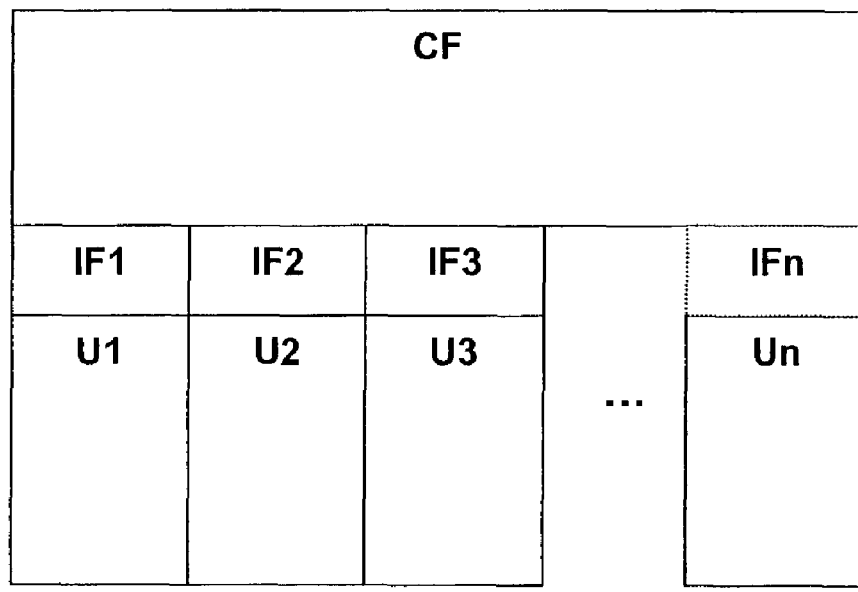
FIG. 2 represents a variation of the structure of the organization of the filters.

According to one embodiment an intermediate layer IF is annexed such as is illustrated in FIG. 2, between the community layer and the user layer. This layer is only accessible to the manager of the system in charge of the community layer and contains the categories that are accessible to the user.

In this way we can give the user the opportunity of accessing his/her layer and defining his/her direct access keys, knowing that he/she will not be able to abandon the frame that is firstly defined by the community layer and the intermediate layer.

According to an embodiment, access to the user by default, usually user U1, has no password. This is particularly useful for facilitating the use of the system by children. Care will have to be taken so that the parameters defined by this user correspond to the younger user.

According to an embodiment of this function, the system is capable of determining which of the users has the maximal limitation and applies it by default to this user when the system is started.

The invention claimed is:

1. A processing system of a television program grid, comprising:
    a device for transmitting information of television programs; and
    a device for receiving the information of television programs having a higher level layer and a plurality of lower levels, the plurality of lower levels includes an intermediate layer and a user layer, each lower level layer further includes program information specific to a users group, parameters defining a user profile of a user of the corresponding users group, and filtering short commands, wherein:
    said parameters includes a plurality of parameter sets, each parameter set corresponding to a filter layer allowing selection of a single category or a plurality of categories of required information,
    the higher level layer is defined as a global restrictive filter and is specified by a first administrator of the system by defining a first password,
    the intermediate level layer includes at least one filter specific to a user profile and is specified by a second administrator of the system by defining a second password,
    the user level layer includes at least one direct access key on a remote control specific to a user profile and is specified by a user profile by defining a third password,
    the at least one direct access key activates or disconnects the global restrictive filter, and
    the higher level layer, the intermediate level layer, and the user level layer are at separate vertical levels.

2. A system according to claim 1, wherein the lower level layers comprises parameters associated with a plurality of functions for activation or de-activation of information categories.

3. A system according to claim 2, wherein the functions for activation or de-activation comprise adding, suppression or definition of one or several information categories.

4. A system according to claim 3, wherein the functions of activation or de-activation are enabled by specific keys on a remote control.

5. A system according to claim 1, wherein the intermediate layer and the global restrictive filter are protected by a same password.

6. A system according to claim 1, wherein the user group having the most restrictive filtering is selected at system start.

7. A system according to claim 1, wherein the at least one direct access key adds or deletes at least one category of television programs.

8. A system according to claim 1, wherein the at least one direct access key defines one or several categories of filter.

9. A system according to claim 1, wherein the at least one direct access key operates without a password.

* * * * *